United States Patent [19]

Benassi

[11] 4,430,066

[45] Feb. 7, 1984

[54] RESILIENTLY SUPPORTED CONNECTION UNIT FOR JOINING A TRANSMISSION SHAFT TO A TRANSMISSION COUPLING ELEMENT

[75] Inventor: Mario Benassi, Turin, Italy

[73] Assignee: RIV-SKF Officine Di Villar Perosa S.p.A., Italy

[21] Appl. No.: 286,573

[22] Filed: Jul. 24, 1981

[51] Int. Cl.³ .............................................. F16C 27/06
[52] U.S. Cl. .................................. 464/178; 308/184 R
[58] Field of Search ......................... 464/178, 180, 182; 308/22, 26, 28, 30, 184 R; 403/258, 259

[56] References Cited

U.S. PATENT DOCUMENTS

| | | | |
|---|---|---|---|
| 3,053,584 | 9/1962 | Dunn | 308/28 |
| 3,325,230 | 6/1967 | Caunt | 308/28 |
| 3,466,104 | 9/1969 | Norrie et al. | 308/184 R |
| 3,639,015 | 2/1972 | Maas | 308/184 R |
| 3,704,922 | 12/1972 | Kleinschmidt et al. | 308/184 R |
| 3,743,365 | 7/1973 | Kato | 308/184 R |
| 3,744,274 | 7/1973 | Sekiya et al. | 464/178 X |

FOREIGN PATENT DOCUMENTS 775212  5/1957  United Kingdom .................. 308/28

*Primary Examiner*—Stuart S. Levy
*Assistant Examiner*—Daniel P. Stodola
*Attorney, Agent, or Firm*—Gifford, Van Ophem, Sheridan & Sprinkle

[57] ABSTRACT

The unit comprises a connection element for connecting one end of a shaft to a coupling element, and provided with a set of active surfaces which comprise a portion of the lateral surface of a pyramid and are arranged to engage with corresponding active surfaces provided in said coupling element or on said second end, said connection element being provided with at least one rolling track for a row of rolling bodies; the unit also comprises a row of rolling bodies disposed between said connection element and a ring which is also provided with a rolling track, said rolling bodies being arranged to roll on said tracks of the connection element and ring, said ring being resiliently supported from a frame.

10 Claims, 4 Drawing Figures

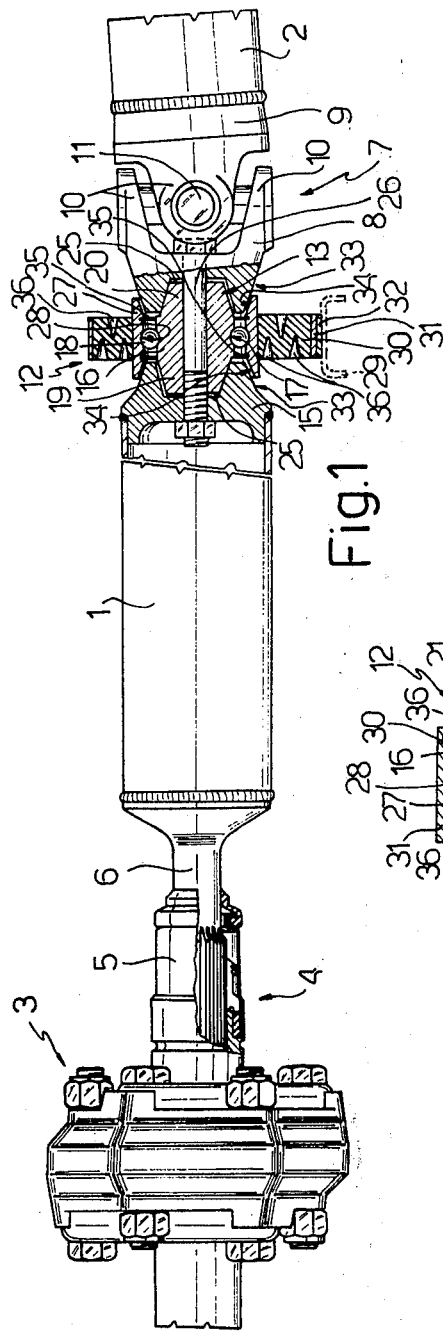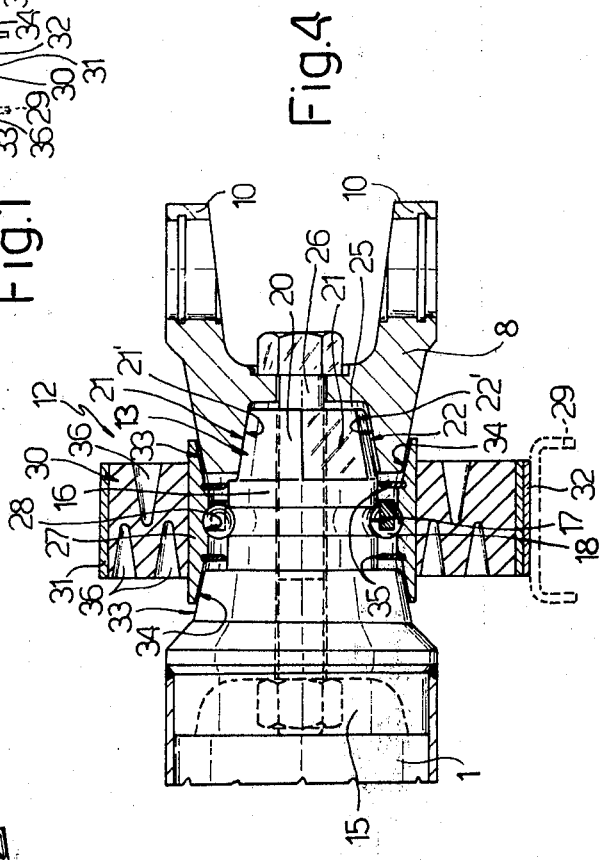

RESILIENTLY SUPPORTED CONNECTION UNIT FOR JOINING A TRANSMISSION SHAFT TO A TRANSMISSION COUPLING ELEMENT

BACKGROUND OF THE INVENTION

This invention relates to a resiliently supported connection unit for joining a transmission shaft to a transmission coupling element; the unit of the invention is particularly suitable for insertion into a motor vehicle transmission which connects the drive clutch to the gearbox or the power unit to an axle.

When they connect the power unit to an axle, transmissions of this type usually comprise a first shaft, a first end of which is connected by a coupling to said unit, and a second shaft, a first end of which is connected to the axle, while the second ends of said shafts are connected together by a universal joint. The second end of the first shaft must also be supported resiliently from the vehicle chassis, and this requirement is satisfied by providing a resilient support comprising a rolling bearing, the inner ring of which is keyed on to said end and the outer ring of which is housed in a bush coupled to an annular element of very deformable resilient material fixed to the chassis.

Consequently the second end of the first shaft must be connected to one of the two half couplings of the universal joint and simultaneously to the bearing of the aforesaid resilient support. In order to satisfy these two requirements, said end comprises a cylindrical portion which constitutes a seat for the inner ring of the bearing and a splined portion (or conical with tongue) arranged to engage in a corresponding splined bore of the hub of the aforesaid half coupling. Suitable shoulders and stop rings are necessary in order to axially lock said bearing both on the second end of the first shaft and inside said bush.

Certain drawbacks are encountered in said connection between the second end of the first shaft and said half coupling and in supporting said end.

The constructional method used for the said connection and support is complicated and therefore costly, requires special care for correct assembly, and if the rotating masses are not perfectly balanced can give rise to vibration.

In this respect, this constructional method requires numerous mechanical components and very precise machining operations on some of them (in particular on the splined coupling between the end of the shaft and the hub of the half coupling).

SUMMARY OF THE INVENTION

The object of the present invention is to provide a resiliently supported connection unit for joining the end of a transmission shaft to a coupling element, which is of very simple and compact structure, of small overall size, of easy assembly and reliable operation, and therefore free from the aforesaid drawbacks.

The invention provides a connection unit for connecting one end of a shaft to a transmission coupling element and for resiliently supporting said end, characterised by comprising a connection element arranged to connect said end of said shaft to said coupling element and provided at least with one set of active surfaces which comprise a portion of the lateral surface of a pyramid and are disposed for engaging with corresponding active surfaces provided on said coupling element or on said shaft end, said connection element being provided with at least one rolling track for a row of revolving bodies; a row of revolving bodies being disposed between said connection element and a ring which is also provided with a rolling track, said revolving bodies being arranged to roll on said tracks of the connection element and ring, said ring being resiliently supported from a frame.

BRIEF DESCRIPTION OF THE DRAWINGS

The invention will be more apparent from the description of some embodiments thereof given hereinafter by way of example, with reference to the accompanying drawings in which:

FIG. 1 is a partial side view, with certain parts shown sectioned, of a motor vehicle transmission in which the unit according to the invention is inserted;

FIG. 4 is a different embodiment of the connection unit.

DETAILED DESCRIPTION OF THE INVENTION

Figure 2:
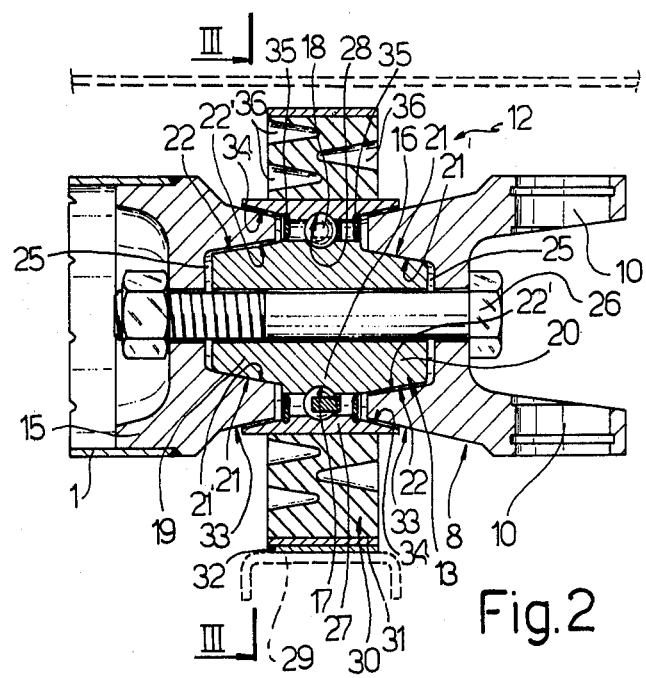
FIG. 2 is a detailed view, to an enlarged scale, of the connection unit according to the invention.

In the example described hereinafter, the connection unit is of the type suitable for insertion into a motor vehicle transmission which is arranged to transmit motion from the power unit to an axle of the vehicle, normally the rear axle. This transmission comprises a first and second shaft indicated by 1 and 2, which are connected to the unit and said axle respectively.

In a transmission of this type, the shaft 1 is normally driven by the power unit by way of a semi-flexible coupling 3 and a toothed coupling 4. The purpose of the former is to correct any geometrical and assembly irregularities in the transmission and to dampen vibration, while the latter enables that part of the transmission downstream of the coupling to make axial movements consequent on the variations which occur in the orientation of the transmission during operation. For this purpose, the coupling 4 normally comprises a bush 5 provided with a set of splines in which there engage corresponding teeth of a short shaft portion 6 which is joined to one end of the shaft 1, for example by welding.

The shafts 1 and 2, which can conveniently consist of tubular elements, are connected together by a coupling 7 which, in the embodiment illustrated, is a universal joint. It is apparent that this coupling could be of any other type, for example a tripod, semi-flexible or flexible coupling.

In the case illustrated, it comprises a pair of coupling elements or half couplings 8 and 9 which are connected together torsionally, but are free to assume any angular orientation relative to each other. If this coupling is a universal joint, as in the case of the embodiment illustrated, each half coupling comprises a pair of arms 10 arranged to receive the pins of a spider 11. The half coupling 9 is directly joined, for example by welding, to the tubular element which forms part of the second shaft 2.

In the example described, the connection unit according to the invention is used for connecting the end of the shaft 1 to the half coupling 8 and for resiliently supporting said end. This unit, indicated overall by 12, comprises an actual connection element 13 disposed between the half coupling and a closure element 15 for said second end of the shaft 1.

As can be seen in FIG. 2, the connection element 13 comprises a substantially cylindrical central part 16, on which there is provided a rolling track 17 for rolling bodies, for example balls 18 in the embodiment illustrated, and two lateral parts 19 and 20, each of which is arranged to form a rigid connection between said element, the closure element 15 and the half coupling 8.

To form said connection, each lateral part 19, 20 of the element 13 comprises a set of active surfaces 21 (FIGS. 2 and 3) which comprise a portion of the lateral surface of a pyramid. In the embodiment illustrated, said active surfaces pertain to the lateral surface of a triangular pyramid, and are therefore three in number. However, it is apparent that they can be of any required number. As can be seen in the sectional view of FIG. 3, between two adjacent active surfaces there is a connection surface 22, substantially in the form of a conical surface portion.

The active surfaces 21 are arranged for engagement with corresponding active surfaces 21', which are provided in corresponding cavities 25 of the closure element 15 and half coupling 8, and have the same form and orientation. However, a certain radial gap is left between the surfaces 22 and 22' as can be seen in the sectional view of FIG. 3.

The connection element 13 is rigidly fixed to the closure element 15 and to the half coupling 8 by means of a tie 26 which traverses corresponding axial bores in said parts, and can be constituted simply by a bolt as in the case of the embodiment illustrated. As can be seen in FIG. 2, the depth of each cavity 25 is greater than the axial length of the lateral parts 19, 20 of the connection element 13, so that when the nut of the bolt 26 is completely screwed down, only the surfaces 21 and 21' come into contact, whereas between the surfaces 22 and 22' and between the base of the cavities 25 and the end surface of said lateral parts 19, 20 a certain rather small gap is left.

Figure 3:
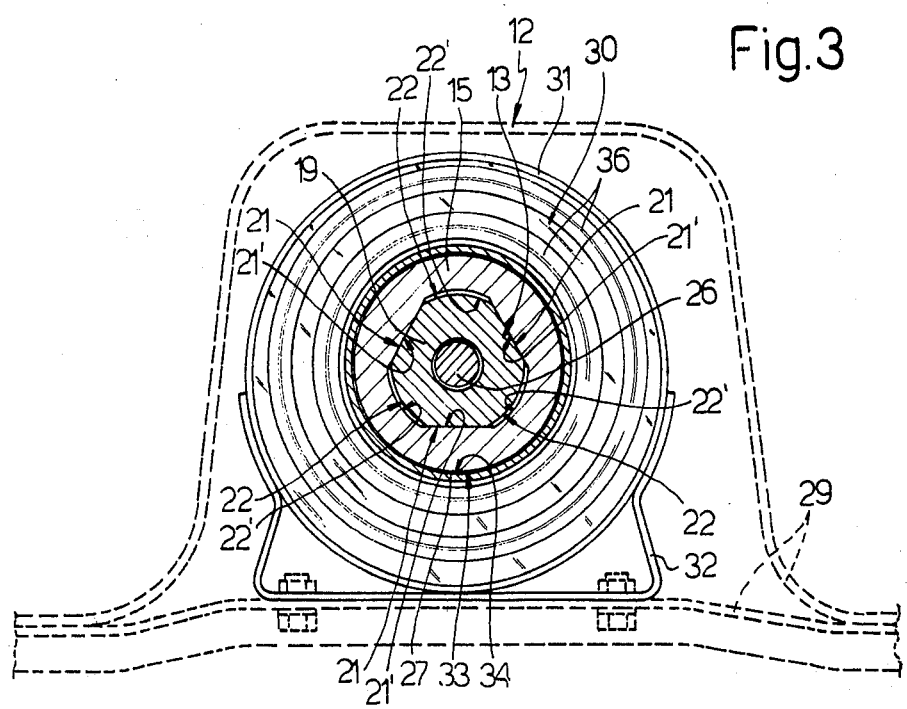
FIG. 3 is a section through the unit of FIG. 2 on the line III—III.

The connection unit 12 also comprises a ring 27 disposed coaxially to the connection element 13, and also comprising a rolling track for the rolling bodies 18. Said ring is resiliently supported from the vehicle chassis 29 (FIGS. 2 and 3) by means of a very deformable annular element 30 of resilient material. This annular element is engaged on the outer surface of the ring 27, and in the embodiment illustrated is contained in a further ring 31 which is fixed to said chassis, for example by means of a stirrup 32 (FIG. 3). Methods different from that described can obviously be used for supporting the annular element 30. In particular, this element could be inserted into a support having a different shape than a ring, and be already provided with means for connection to the chassis. The annular element, which conveniently comprises annular grooves 36 (FIG. 2) for making it more deformable, can be of non-constant radial thickness, as in the case of the embodiment illustrated, in which the ring 31 is not coaxial with the ring 27, but is slightly off-centre relative thereto.

The annular element 30 can be constructed of any deformable resilient material, for example rubber or elastomer. In the former case, it can be directly vulcanised on the outer surface of the ring 27 and inner surface of the ring 31.

The closure element 15 and half coupling 8 are conveniently provided with a conical surface 33, the axis of which coincides with that of the ring 27, and ring 27 is provided with a pair of conical surfaces 34 coaxial to the preceding. The dimensions of these surfaces are chosen such as to leave a fairly small radial gap between each pair of surfaces 33, 34, in order to form thereby a labyrinth which creates a high resistance to the passage of foreign bodies towards the row of revolving bodies 18, and thus protects them. Seal gaskets 35 disposed to the side of said row further protect the revolving bodies and retain the lubricating grease.

The connection element 13 can also be formed in one piece with the closure element 15 or with the half coupling 8. The first of these embodiments is shown in FIG. 4, which differs from that heretofore described only in that the coupling between the surfaces 21 of the lateral part 19 (FIG. 2) of the connection element 13 and the surfaces 21' of the closure element 14 is dispensed with by forming the former in one piece with the latter (FIG. 4).

It is apparent that the other embodiment (connection element 13 in one piece with the half coupling 8) can be easily and immediately conceived from the aforegoing description, although it is not shown.

The operation of the described connection unit is as follows.

In the described transmission of the example, motion is transmitted by the engine through the couplings 3 and 4 to the shaft 1, and from here to the half coupling 8 through the connection unit 12, and then to the shaft 2. Because of the high pressures which can be generated between the engaged surfaces 21, 21' (FIG. 3), this unit is able to transmit very high torques. Moreover, because of the form and orientation of said engaged surfaces, there is a very effective centering action between the connection element 13, closure element 15 and half coupling 8, which makes the three said parts perfectly coaxial.

During rotation of the shafts 1 and 2, the revolving bodies 18 roll on the relative rolling tracks 17 and 28 of the connection element 13 and ring 27, the annular element 30 being able to dampen the vibration and allow small oscillations of the end itself.

It is apparent that the described connection unit 12 is very compact and has a very small overall size. In addition, the component parts of said unit are small in number, are of very simple form and can be easily connected together. The result is that besides allowing correct operation, the unit according to the invention enables perfect balancing to be obtained of the transmission in which it is inserted.

It is apparent that modifications can be made to the described embodiments of the present invention, both in the form and arrangement of the various parts, without leaving the scope of the inventive idea.

In particular, the connection unit according to the invention could be used for connecting a shaft to a half coupling in any other transmission completely different from that illustrated and not designed for automobile use. In addition, the half coupling which is connected to said shaft by the unit of the invention could be of a completely different form and structure, depending on the type of coupling of which it forms part. A coupling which can be used in association with the unit of the invention must be of the type in which the two elements are free to vary their relative position, and thus in addition to a universal joint, it can be of any mobile, semi-flexible or flexible type, such as a tripod coupling, a coupling with rubber elements, a spring coupling or the like.

What we claim is:

1. A connection unit for connecting one end of a shaft to a transmission coupling element and for resiliently supporting said end comprising a connection element arranged to connect said end of said shaft to said coupling element, said connection element having at least one axially extended portion with a substantially pyramidic shape forming a plurality of flat lateral surfaces, each flat lateral surface portion of said substantially pyramidic portion defining a first active surface, wherein at least one of said coupling element and said end of said shaft include an end portion having a pyramidic shape forming a plurality of second active surfaces equal in number to and adapted to mate with said first active surfaces, said connection element being provided with at least one rolling track for a row of revolving bodies;

a ring which is also provided with a rolling track;

a row of revolving bodies being disposed between said connection element and said ring; a frame, and means for resiliently supporting said ring from said frame.

2. A connection unit as claimed in claim 1, characterized in that said connection element, said coupling element and said end are connected axially together by a tie inserted in an axial bore of said connection element and said coupling element.

3. A connection unit as claimed in claim 2, characterized in that said tie comprises a head and a threaded shank on which a threaded connection member is screwed.

4. A connection unit as claimed in claim 1, characterized in that said connection element comprises a further substantially pyramidic extended portion having further first active surfaces, each of which comprises a portion of the lateral surface of a pyramid, and wherein said coupling element includes an end portion having a corresponding number of further second active surfaces adapted to mate with said further first active surfaces of said further pyramidic extended portion.

5. A connection unit as claimed in claim 1, characterized in that said active surfaces of said connection element comprise a truncated portion of the lateral surfaces of said pyramidic portion.

6. A connection unit as claimed in claim 1, characterized in that said connector element includes a first substantially conical surface portion intermediate adjacent active surfaces, and wherein said end portion of said at least one of said coupling element and said shaft includes correspondingly positioned second substantially conical surface portions spaced apart from said first substantially conical surface portions to define a gap therebetween.

7. A connection unit as claimed in claim 1, characterized in that said means comprises an annular element of very deformable resilient material.

8. A connection unit as claimed in claim 7, characterized in that said annular element is of rubber and is vulcanized directly on the outer surface of said ring.

9. A connection unit as claimed in claim 1, characterized in that said end portion of said at least one of said shaft and said coupling element includes a tubular wall portion and wherein said ring includes an axially extending portion overlapping at least a portion of said tubular wall portion.

10. A connection unit as claimed in claim 9, characterized in that said tubular portion is a portion of conical surface, and the inner surface of said axially extending portion of said ring comprises a corresponding portion of conical surface.

* * * * *